(12) United States Patent
Hong

(10) Patent No.: US 12,666,449 B2
(45) Date of Patent: Jun. 23, 2026

(54) METHOD AND APPARATUS FOR PARTIAL SENSING OPERATION IN SIDELINK COMMUNICATION

(71) Applicants: HYUNDAI MOTOR COMPANY, Seoul (KR); KIA CORPORATION, Seoul (KR)

(72) Inventor: Ui Hyun Hong, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 118 days.

(21) Appl. No.: 18/200,313

(22) Filed: May 22, 2023

(65) Prior Publication Data

US 2023/0413300 A1      Dec. 21, 2023

Related U.S. Application Data

(63) Continuation-in-part of application No. PCT/KR2021/017461, filed on Nov. 25, 2021.

(30) Foreign Application Priority Data

Nov. 26, 2020   (KR) ........................ 10-2020-0161579
Nov. 24, 2021   (KR) ........................ 10-2021-0163637

(51) Int. Cl.
*H04W 72/40*         (2023.01)
(52) U.S. Cl.
CPC .................................. *H04W 72/40* (2023.01)
(58) Field of Classification Search
None
See application file for complete search history.

(56) References Cited

U.S. PATENT DOCUMENTS

| | | | | |
|---|---|---|---|---|
| 10,536,949 | B2 | 1/2020 | Sheng | |
| 2020/0029245 | A1* | 1/2020 | Khoryaev | ............. H04W 36/22 |
| 2020/0229171 | A1* | 7/2020 | Khoryaev | ............... H04W 4/40 |
| 2022/0030555 | A1* | 1/2022 | Chae | ..................... H04L 5/0023 |
| 2023/0262661 | A1* | 8/2023 | Zhang | ................. H04L 27/0006 |

(Continued)

OTHER PUBLICATIONS

3GPP, "Resource allocation for sidelink power saving", 3GPP TSG WG1 #103-e, R1-2007688, e-meeting, Oct. 26-Nov. 13, 2020, 10 pages.

(Continued)

*Primary Examiner* — Marcus Smith
*Assistant Examiner* — Rowan K Fakhro
(74) *Attorney, Agent, or Firm* — Morgan Lewis & Bockius LLP

(57)         ABSTRACT

A method and an apparatus for a partial sensing operation in sidelink communication are disclosed. An operating method of a transmission terminal includes the steps of receiving configuration information of an additional partial sensing window from a base station; determining one or more candidate resources by performing a sensing operation in a sensing window; identifying an occupancy state of at least one candidate resource among the one or more candidate resources by performing a partial sensing operation in the additional partial sensing window configured according to the configuration information; and determining a first candidate resource among the one or more candidate resources as a transmission resource in consideration of the occupancy state within a selection window.

17 Claims, 8 Drawing Sheets sensing window                                    selection window $t_y-100ms$                          $t_y$                          Time ▨ : additional partial sensing window    ▧ : candidate resource (or transmission resource

(56) References Cited

U.S. PATENT DOCUMENTS

| | | | | |
|---|---|---|---|---|
| 2023/0269704 A1* | 8/2023 | Sun | ...................... | H04W 28/26 |
| | | | | 370/329 |
| 2023/0276525 A1* | 8/2023 | Zhang | ................... | H04W 72/02 |
| | | | | 370/329 |
| 2023/0337188 A1* | 10/2023 | Selvanesan | ......... | H04W 72/044 |
| 2023/0362896 A1* | 11/2023 | Wu | ....................... | H04W 72/02 |
| 2023/0370210 A1* | 11/2023 | Grieco | .................. | H04L 5/0055 |
| 2025/0203515 A1* | 6/2025 | Hoang | .............. | H04W 52/0225 |

OTHER PUBLICATIONS

3GPP, "FL summary for AI 8.11.2.1—resource allocation for power saving", 3GPP TSG RAN WG1 #103-e, R1-2009584, e-Meeting, Oct. 26-Nov. 13, 2020, 64 pages.

International Search dated Mar. 8, 2022 cited in International Patent Application No. PCT/KR2021/017461 (w/English translation).

"Resource allocation mechanisms for power saving," 3GPP TSG-RAN WG1 Meeting #102-e, e-Meeting, Ericsson, Aug. 17-28, 2020 (R1-2006444).

"Sidelink resource allocation to reduce power consumption," 3GPP TSG RAN WG1 Meeting #103-e, E-Meeting, Huawei, HiSilicon, Oct. 26 through Nov. 13, 2020 (R1-2007615).

"WID revision: NR sidelink enhancement," 3GPP TSG RAN Meeting #88-e, Electronic Meeting, LG Electronics, Jun. 29 through Jul. 3, 2020 (RP-201385).

"Sidelink resource allocation for Power saving," 3GPP TSG RAN WG1 #103-e, e-Meeting, Lenovo, Motorola Mobility, Oct. 26 through Nov. 13, 2020 (R1-2008917).

"Discussion of resource allocation for power saving," 3GPP TSG RAN WG1 #103-e, e-Meeting, Nokia, Nokia Shanghai Bell, Oct. 26 through Nov. 13, 2020 (R1-2007622).

* cited by examiner

【FIG. 1】
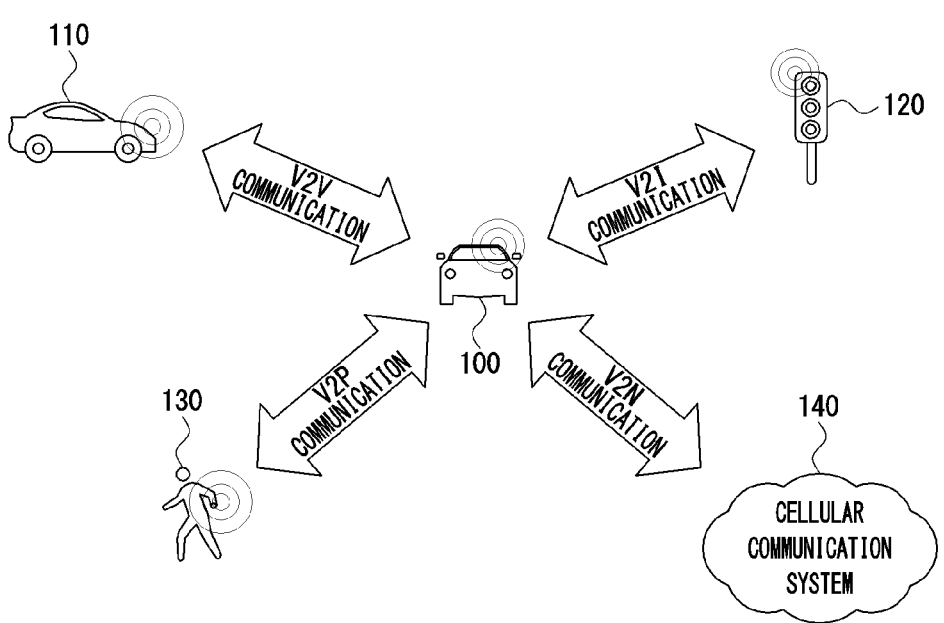

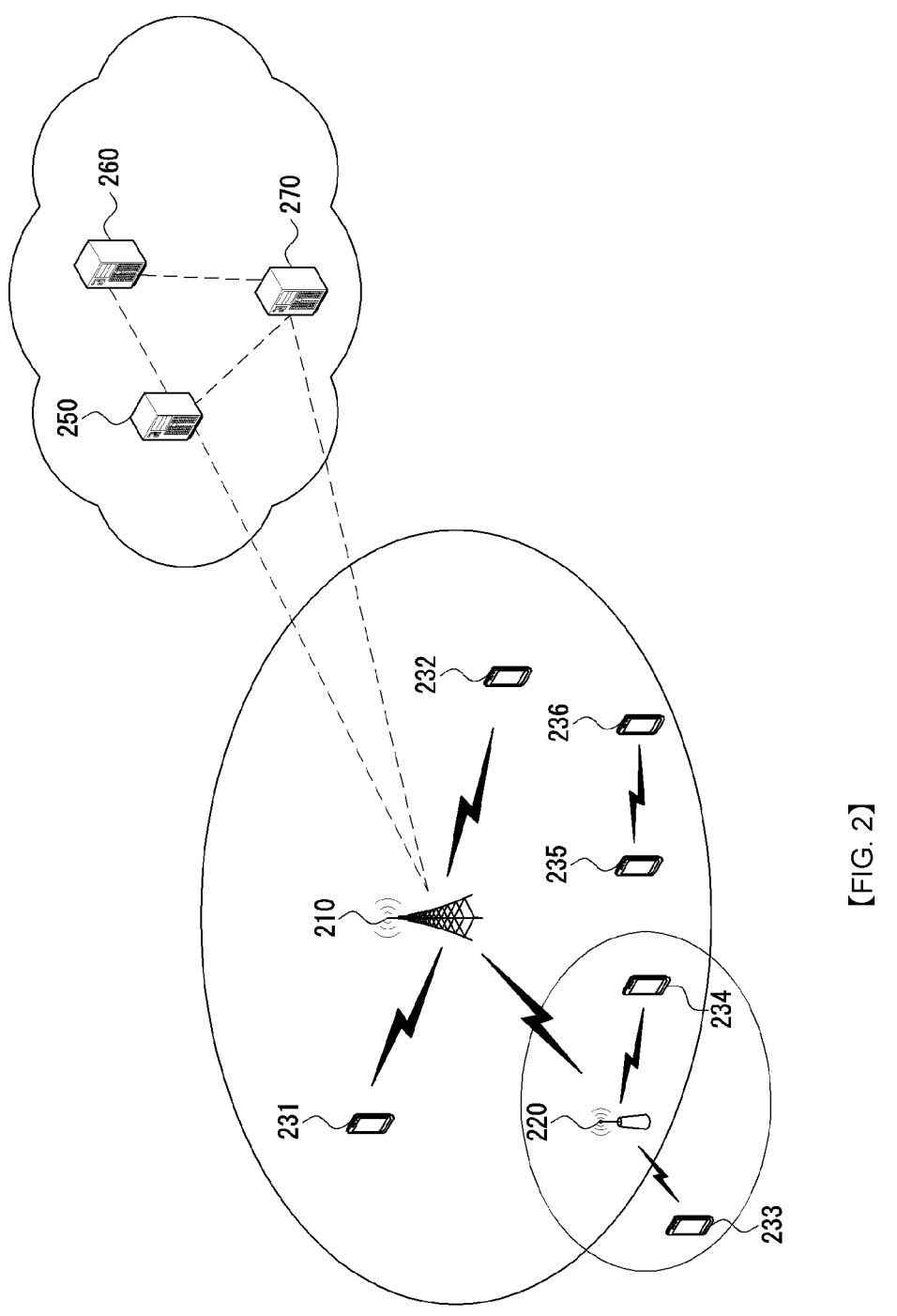
[FIG. 2]

【FIG. 3】
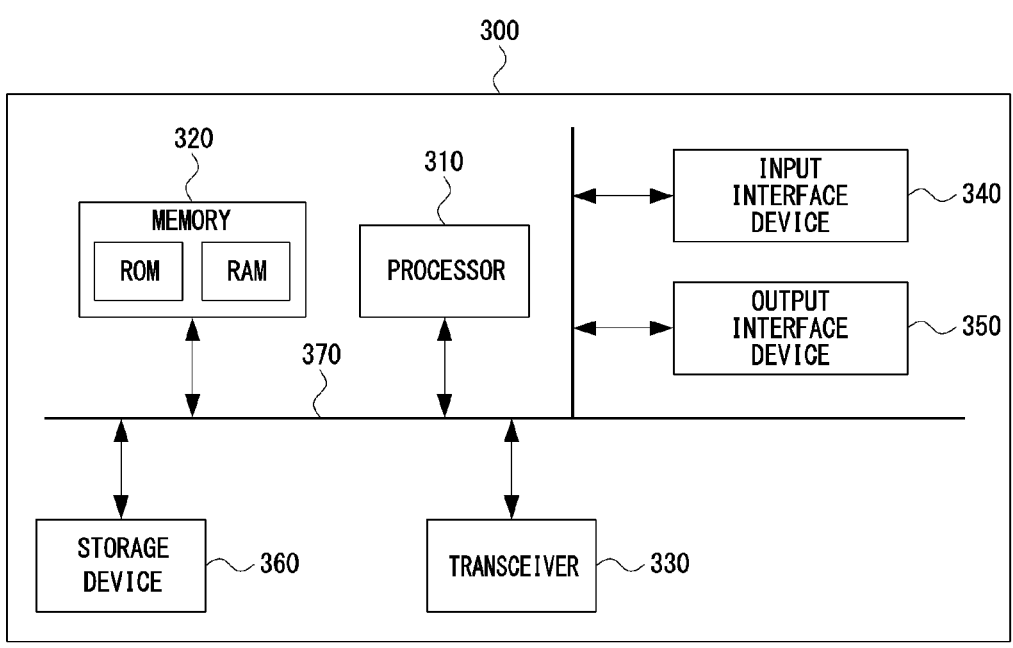
【FIG. 4】
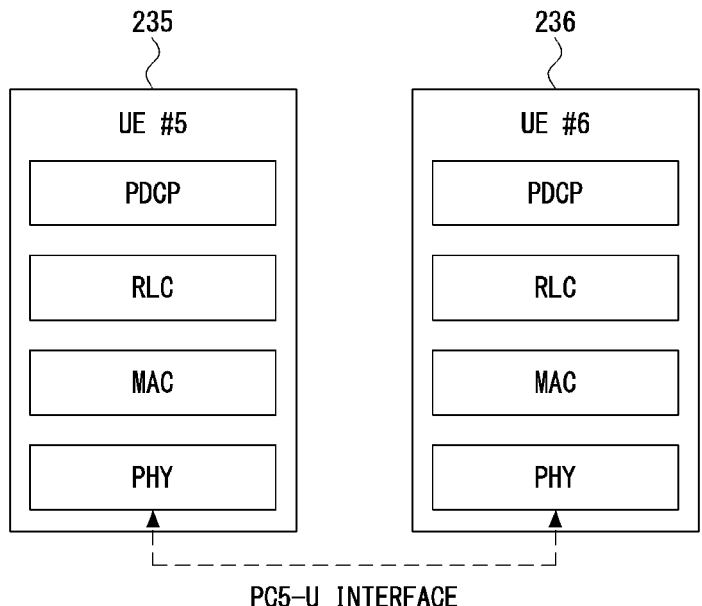

【FIG. 5】
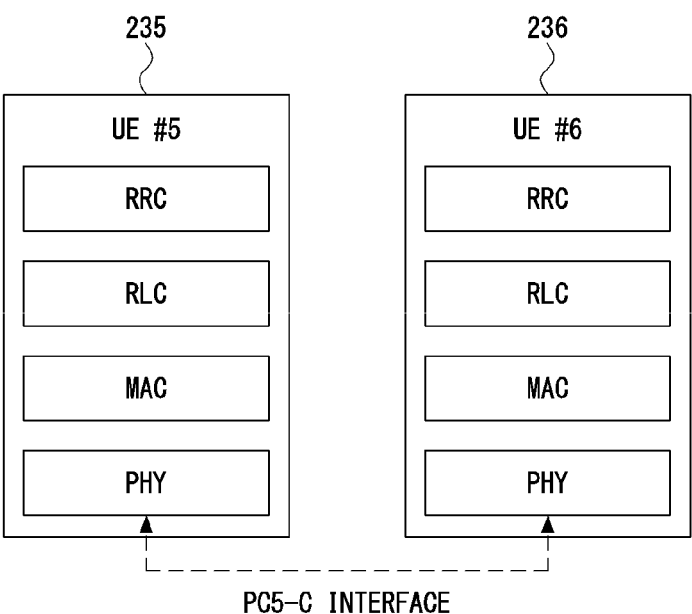
PC5-C INTERFACE
【FIG. 6】
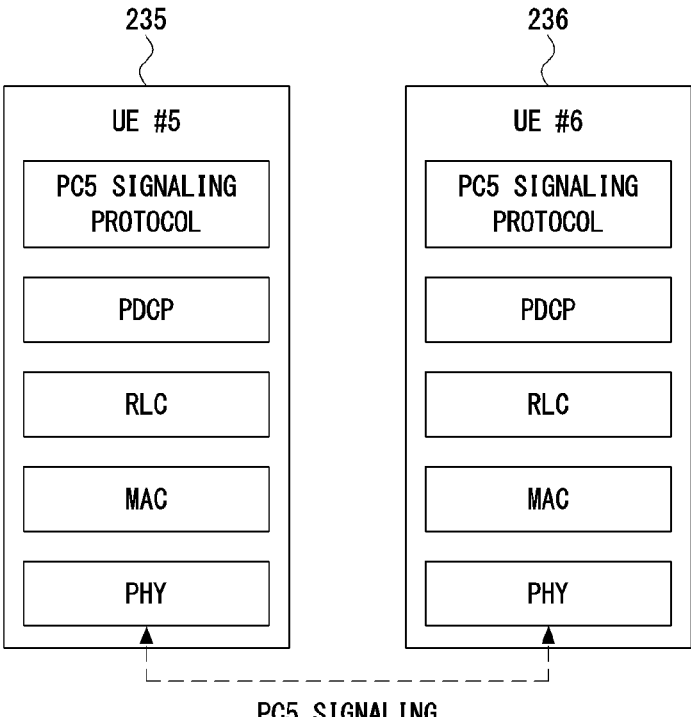
PC5 SIGNALING

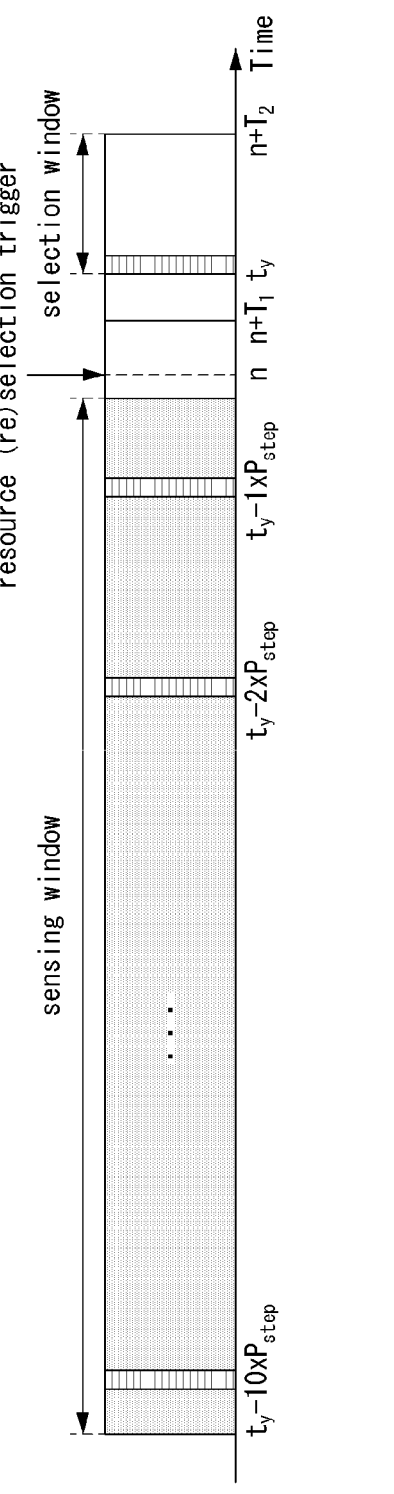
[FIG. 7]

【FIG. 8】
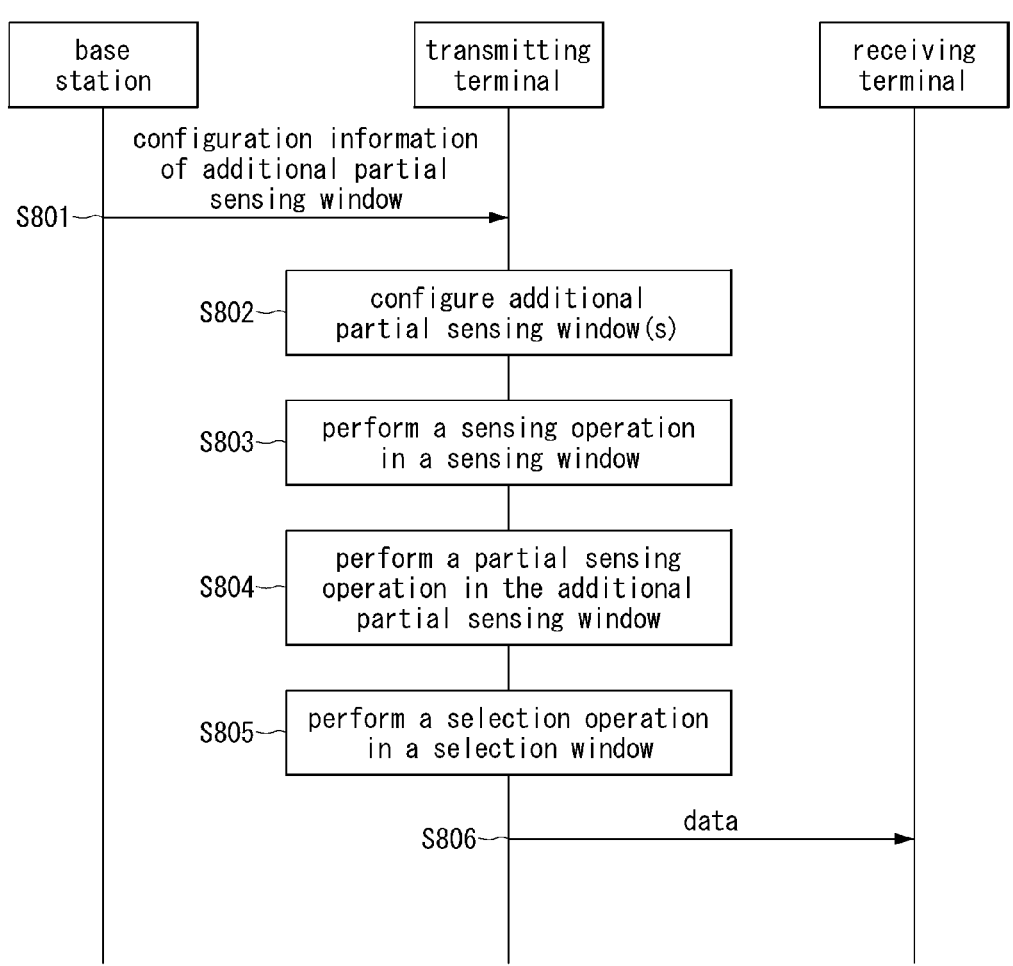

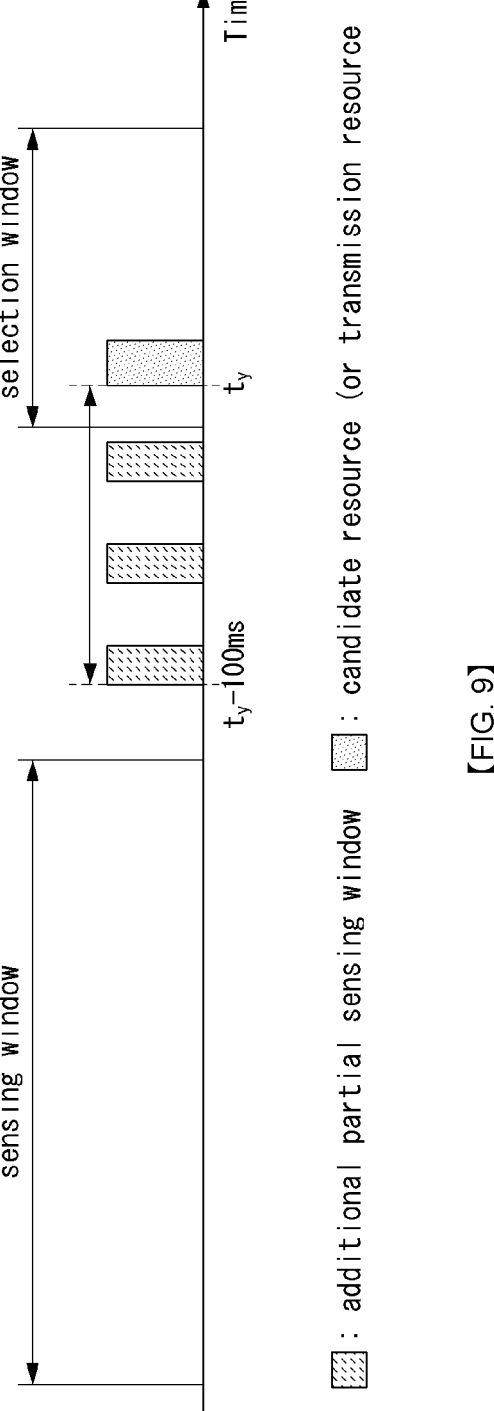
[FIG. 9]

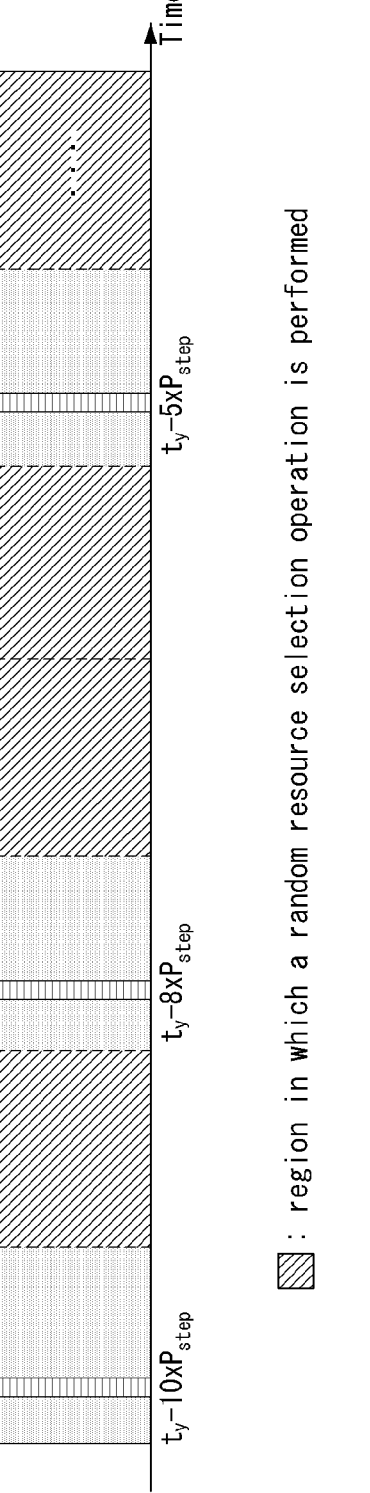
[FIG. 10]
⬜ : region in which a random resource selection operation is performed

METHOD AND APPARATUS FOR PARTIAL SENSING OPERATION IN SIDELINK COMMUNICATION

CROSS-REFERENCE TO RELATED APPLICATION

The present application is a continuation-in-part of currently pending International Patent Application No. PCT/KR2021/017461, filed Nov. 25, 2021, which claims priority to Korean Patent Application No. 10-2020-0161579, filed Nov. 26, 2020 and Korean Patent Application No. 10-2021-0163637, filed Nov. 24, 2021, the entire contents of which is incorporated herein for all purposes by this reference.

BACKGROUND OF THE PRESENT DISCLOSURE

Field of the Present Disclosure

The present disclosure relates to a sidelink communication technique, and to a technique for configuration of a partial sensing window and partial sensing operations within the partial sensing window.

Description of Related Art

A Fifth-Generation (5G) communication system (e.g., New Radio (NR) communication system) which uses a frequency band higher than a frequency band of a Fourth-Generation (4G) communication system (e.g., Long Term Evolution (LTE) communication system or LTE-Advanced (LTE-A) communication system) as well as the frequency band of the 4G communication system has been considered for processing of wireless data. The 5G communication system can support Enhanced Mobile Broadband (eMBB) communications, Ultra-Reliable and Low-Latency communications (URLLC), massive Machine Type Communications (mMTC), and the like.

The 4G communication system and 5G communication system can support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication systems, the V2X communications (e.g., C-V2X communications) may be performed based on sidelink communication technologies (e.g., Proximity-based Services (ProSe) communication technology, Device-to-Device (D2D) communication technology, or the like). For example, sidelink channels for vehicles participating in V2V communications may be established, and communications between the vehicles may be performed using the sidelink channels. Sidelink communication may be performed using configured grant (CG) resources. The CG resources may be periodically configured, and periodic data (e.g., periodic sidelink data) may be transmitted using the CG resources.

Meanwhile, a terminal may determine one or more candidate resources by performing a sensing operation within a sensing window, determine transmission resource(s) from among the one or more candidate resources by performing a selection operation within a selection window, and perform sidelink communication using the transmission resource(s). The sensing operation and/or selection operation may not be performed in a period from an end time of the sensing window to a start time of the selection window.

On the other hand, a re-evaluation operation and/or a pre-emption operation may be performed in a period before the transmission resource selected by the selection operation or the period from the end time of the sensing window to the start time of the selection window. Resource(s) selected by the re-evaluation operation and/or the pre-emption operation may collide with the resource(s) determined by the above-described selection operation. In the instant case, sidelink transmission may fail.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

The present disclosure is directed to providing a method and an apparatus for configuration of a partial sensing window and partial sensing operations.

A method of a transmitting terminal, according to various exemplary embodiments of the present disclosure for achieving the above-described objective, may include: receiving, from a base station, configuration information of additional partial sensing window(s); determining one or more candidate resources by performing a sensing operation in a sensing window; identifying an occupancy state of at least one candidate resource among the one or more candidate resources by performing a partial sensing operation in the additional partial sensing window(s) configured according to the configuration information; determining a first candidate resource among the one or more candidate resources as a transmission resource within a selection window in consideration of the occupancy state; and performing sidelink communication with a receiving terminal using the transmission resource.

The additional partial sensing window(s) may be configured within a period $[t_y\text{-}P_{step}, t_y]$, where $t_y$ is a start time of a specific candidate resource within the selection window, and $P_{step}$ is a configuration periodicity of existing additional partial sensing window(s) within the sensing window.

A configuration periodicity of the additional partial sensing window(s) may be set to be shorter than $P_{step}$.

The configuration information may include at least one of a type 2-bitmap indicating a start time of the additional partial sensing window, information indicating a number of times of applying the type 2-bitmap, a configuration periodicity of the additional partial sensing window(s), information of a scale for the configuration periodicity, or an enable indicator indicative of whether to configure the additional partial sensing window(s).

When the number of times of applying the type 2-bitmap is N, a period $[t_y\text{-}P_{step}, t_y]$ in which the additional partial sensing window(s) are configured may be divided into N period, and the type 2-bitmap may be applied to each of the N periods, N being a natural number.

The configuration periodicity of the additional partial sensing window(s) may be inversely proportional to the number of times of applying the type 2-bitmap.

A size of the additional partial sensing window may be determined according to a ratio of a first value or a second value in the type 2-bitmap.

A configuration periodicity of the additional partial sensing window(s) may be set differently for each subcarrier spacing.

A candidate resource occupied by another terminal among the one or more candidate resources may not be determined as the transmission resource.

The occupied candidate resource may be a resource selected by a re-evaluation operation or a pre-emption operation.

A transmitting terminal, according to various exemplary embodiments of the present disclosure for achieving the above-described objective, may include a processor and a memory storing one or more instructions executable by the processor, and the one or more instructions may be executed to perform: receiving, from a base station, configuration information of additional partial sensing window(s); determining one or more candidate resources by performing a sensing operation in a sensing window; identifying an occupancy state of at least one candidate resource among the one or more candidate resources by performing a partial sensing operation in the additional partial sensing window(s) configured according to the configuration information; determining a first candidate resource among the one or more candidate resources as a transmission resource within a selection window in consideration of the occupancy state; and performing sidelink communication with a receiving terminal using the transmission resource.

The additional partial sensing window(s) may be configured within a period $[t_y\text{-}P_{step}, t_y]$, where $t_y$ is a start time of a specific candidate resource within the selection window, $P_{step}$ is a configuration periodicity of existing additional partial sensing window(s) within the sensing window, and a configuration periodicity of the additional partial sensing window(s) may be set to be shorter than $P_{step}$.

The configuration information may include at least one of a type 2-bitmap indicating a start time of the additional partial sensing window, information indicating a number of times of applying the type 2-bitmap, a configuration periodicity of the additional partial sensing window(s), information of a scale for the configuration periodicity, or an enable indicator indicative of whether to configure the additional partial sensing window(s).

When the number of times of applying the type 2-bitmap is N, a period $[t_y\text{-}P_{step}, t_y]$ in which the additional partial sensing window(s) are configured may be divided into N period, and the type 2-bitmap may be applied to each of the N periods, N being a natural number.

A size of the additional partial sensing window may be determined according to a ratio of a first value or a second value in the type 2-bitmap.

A configuration periodicity of the additional partial sensing window(s) may be set differently for each subcarrier spacing.

A candidate resource occupied by another terminal among the one or more candidate resources may not be determined as the transmission resource, and the occupied candidate resource may be a resource selected by a re-evaluation operation or a pre-emption operation.

According to an exemplary embodiment of the present disclosure, additional partial sensing window(s) may be configured, and the transmitting terminal may identify an occupancy state of candidate resource(s) by performing a partial sensing operation in the additional partial sensing window(s). The transmitting terminal may select resources other than occupied candidate resources within a selection window as transmission resource(s), and may perform sidelink communication with the receiving terminal using the transmission resource(s). As the partial sensing operation is additionally performed, a resource collision probability may be reduced, and the sidelink communication may be efficiently performed.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 1 is a conceptual diagram illustrating V2X communication scenarios.

FIG. 2 is a conceptual diagram illustrating an exemplary embodiment of a cellular communication system.

FIG. 3 is a conceptual diagram illustrating an exemplary embodiment of a communication node forming a cellular communication system.

FIG. 4 is a block diagram illustrating an exemplary embodiment of a user plane protocol stack of a UE performing sidelink communication.

FIG. 5 is a block diagram illustrating a first exemplary embodiment of a control plane protocol stack of a UE performing sidelink communication.

FIG. 6 is a block diagram illustrating a second exemplary embodiment of a control plane protocol stack of a UE performing sidelink communication.

FIG. 7 is a conceptual diagram illustrating a first exemplary embodiment of a partial sensing operation in sidelink communication.

FIG. 8 is a sequence chart illustrating a first exemplary embodiment of a method for configuring additional partial sensing window(s) in sidelink communication.

FIG. 9 is a conceptual diagram illustrating a first exemplary embodiment of additional partial sensing window(s) in sidelink communication.

FIG. 10 is a conceptual diagram illustrating a region in which a random resource selection operation is performed and a region in which a partial sensing operation is performed.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments. On the contrary, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Because the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

In exemplary embodiments of the present disclosure, '(re)transmission' may refer to 'transmission', 'retransmission', or 'transmission and retransmission', '(re)configuration' may refer to 'configuration', 'reconfiguration', or 'configuration and reconfiguration', '(re)connection' may refer to 'connection', 'reconnection', or 'connection and reconnection', and '(re)access' may refer to 'access', 're-access', or 'access and re-access'.

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments of the present disclosure, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as including meanings matched with contextual meanings in the art. In the present description, unless defined clearly, terms are not necessarily construed as including formal meanings.

Hereinafter, forms of the present disclosure will be described in detail with reference to the accompanying drawings. In describing the present disclosure, to facilitate the entire understanding of the present disclosure, like numbers refer to like elements throughout the description of the figures and the repetitive description thereof will be omitted.

FIG. 1 is a conceptual diagram illustrating V2X communication scenarios.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged through the V2V communications. The V2V communications supported in the cellular communication system 140 may be performed based on "sidelink" communication technologies (e.g., ProSe and D2D communication technologies, and the like). In the instant case, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported in the cellular communication system 140 may also be performed based on sidelink communication technologies (e.g., ProSe and D2D communication technologies, and the like). In the instant case, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 through the V2P communications.

The communication node located in the vehicle 100 or the communication node carried by the person 130 may generate an alarm indicating a danger by judging a dangerous situation based on the obtained driving information and movement information. The V2P communications supported in the cellular communication system 140 may be performed based on sidelink communication technologies (e.g., ProSe and D2D communication technologies, and the like). In the instant case, the communications between the communication node located in the vehicle 100 and the communication node carried by the person 130 may be performed using at least one sidelink channel established between the communication nodes.

The V2N communications may be communications between the first vehicle 100 (e.g., the communication node located in the vehicle 100) and a server connected through the cellular communication system 140. The V2N communications may be performed based on the 4G communication technology (e.g., LTE or LTE-A) or the 5G communication technology (e.g., NR). Also, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

FIG. 2 is a conceptual diagram illustrating an exemplary embodiment of a cellular communication system.

As shown in FIG. 2, a cellular communication system may include an access network, a core network, and the like. The access network may include a base station 210, a relay 220, User Equipments (UEs) 231, 232, 233, 234, 235 and 236, and the like. The UEs 231, 232, 233, 234, 235 and 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, and the core network constituted by the UPF 250, the SMF 260, and the AMF 270 may support the 4G communication technology as well as the 5G communication technology.

In addition, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) including the cellular communication system may perform communications by use of at least one communication technology among a Code Division Multiple Access (CDMA) technology, a Time Division Multiple Access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) including the cellular communication system may be configured as follows.

FIG. 3 is a conceptual diagram illustrating an exemplary embodiment of a communication node forming a cellular communication system.

As shown in FIG. 3, a communication node 300 may include at least one processor 310, a memory 320, and a transceiver 330 connected to a network for performing communications. Also, the communication node 300 may further include an input interface device 340, an output interface device 350, a storage device 360, and the like. Each component included in the communication node 300 may communicate with each other as connected through a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium and a non-volatile storage medium. For example, the memory 320 may include at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may transmit signals received from the core network to the UEs 231, 232, 233, 234, 235 and 236 and the relay 220, and may transmit signals received from the UEs 231, 232, 233, 234, 235 and 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. That is, the relay 220 may transmit signals received from the base station 210 to the UEs 233 and 234, and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. That is, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

Here, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231, 232, 233, 234, 235 and 236 may be referred to as a terminal, an access terminal, a mobile terminal, a station, a subscriber station, a mobile station, a portable subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
| --- | --- | --- |
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows.

FIG. 4 is a block diagram illustrating an exemplary embodiment of a user plane protocol stack of a UE performing sidelink communication.

As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A, B, C and D of Table 1. The user plane protocol stack of each of the UEs 235 and 236 may include a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications, and the layer 2-ID may be an ID configured for the V2X communications (e.g., V2X service). Also, in the sidelink communications, a hybrid automatic repeat request (HARQ) feedback operation may be supported, and an RLC acknowledged mode (RLC AM) or an RLC unacknowledged mode (RLC UM) may be supported.

Meanwhile, a control plane protocol stack of the UEs (e.g., the UEs 235 and 236) performing sidelink communications may be configured as follows.

FIG. 5 is a block diagram illustrating a first exemplary embodiment of a control plane protocol stack of a UE performing sidelink communication, and FIG. 6 is a block diagram illustrating a second exemplary embodiment of a control plane protocol stack of a UE performing sidelink communication.

As shown in FIG. 5 and FIG. 6, a left UE may be the UE 235 shown in FIG. 2 and a right UE may be the UE 236 shown in FIG. 2. The scenario for the sidelink communications between the UEs 235 and 236 may be one of the sidelink communication scenarios A, B, C and D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Also, a demodulation reference signal (DM-RS), a synchronization signal, or the like may be used in the sidelink communications between the UEs 235 and 236. The synchronization signal may include a primary sidelink synchronization signal (PSSS) and a secondary sidelink synchronization signal (SSSS).

Meanwhile, a sidelink transmission mode (TM) may be classified into sidelink TMs 1 to 4 as shown below in Table 2.

TABLE 2

| Sidelink TM | Description |
| --- | --- |
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In the instant case, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In the instant case, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In the instant case, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. In the instant case, the sidelink data may be transmitted and received through resources selected autonomously by the UE (e.g., UE 235 or 236) within the resource pool configured by the dedicated RRC signaling procedure or the broadcast RRC signaling procedure.

Hereinafter, sidelink communication methods will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a UE #1 (e.g., vehicle #1) is described, a UE #2 (e.g., vehicle #2) corresponding thereto may perform an operation corresponding to the operation of the UE #1. Conversely, when an operation of the UE #2 is described, the corresponding UE #1 may perform an operation corresponding to the operation of the UE #2. In exemplary embodiments described below, an operation of a vehicle may be an operation of a communication node located in the vehicle.

In exemplary embodiments of the present disclosure, signaling may be one or a combination of two or more of higher layer signaling, MAC signaling, and physical (PHY) signaling. A message used for higher layer signaling may be referred to as a 'higher layer message' or 'higher layer signaling message'. A message used for MAC signaling may be referred to as a 'MAC message' or 'MAC signaling message'. A message used for PHY signaling may be referred to as a 'PHY message' or 'PHY signaling message'. The higher layer signaling may refer to an operation of transmitting and receiving system information (e.g., master information block (MIB), system information block (SIB)) and/or an RRC message. The MAC signaling may refer to an operation of transmitting and receiving a MAC control element (CE). The PHY signaling may refer to an operation of transmitting and receiving control information (e.g., downlink control information (DCI), uplink control information (UCI), or SCI).

A sidelink signal may be a synchronization signal and a reference signal used for sidelink communication. For example, the synchronization signal may be a synchronization signal/physical broadcast channel (SS/PBCH) block, sidelink synchronization signal (SLSS), primary sidelink synchronization signal (PSSS), secondary sidelink synchronization signal (SSSS), or the like. The reference signal may be a channel state information-reference signal (CSI-RS), DM-RS, phase tracking-reference signal (PT-RS), cell-specific reference signal (CRS), sounding reference signal (SRS), discovery reference signal (DRS), or the like.

A sidelink channel may be a PSSCH, PSCCH, PSDCH, PSBCH, physical sidelink feedback channel (PSFCH), or the like. In addition, a sidelink channel may refer to a sidelink channel including a sidelink signal mapped to specific resources in the corresponding sidelink channel. The sidelink communication may support a broadcast service, a multicast service, a groupcast service, and a unicast service.

The sidelink communication may be performed based on a single-SCI scheme or a multi-SCI scheme. When the single-SCI scheme is used, data transmission (e.g., sidelink data transmission, sidelink-shared channel (SL-SCH) transmission) may be performed based on one SCI (e.g., 1st-stage SCI). When the multi-SCI scheme is used, data transmission may be performed using two SCIs (e.g., 1st-stage SCI and 2nd-stage SCI). The SCI(s) may be transmitted on a PSCCH and/or a PSSCH. When the single-SCI scheme is used, the SCI (e.g., 1st-stage SCI) may be transmitted on a PSCCH. When the multi-SCI scheme is used, the 1st-stage SCI may be transmitted on a PSCCH, and the 2nd-stage SCI may be transmitted on the PSCCH or a PSSCH. The 1st-stage SCI may be referred to as 'first-stage SCI', and the 2nd-stage SCI may be referred to as 'second-stage SCI'. A format of the first-stage SCI may include a SCI format 1-A, and a format of the second-stage SCI may include a SCI format 2-A and a SCI format 2-B.

The 1st-stage SCI may include or more information elements among priority information, frequency resource assignment information, time resource assignment information, resource reservation period information, demodulation reference signal (DMRS) pattern information, 2nd-stage SCI format information, a beta_offset indicator, the number of DMRS ports, and modulation and coding scheme (MCS) information. The 2nd-stage SCI may include one or more information elements among a HARQ processor identifier (ID), a redundancy version (RV), a source ID, a destination ID, CSI request information, a zone ID, and communication range requirements.

FIG. 7 is a conceptual diagram illustrating a first exemplary embodiment of a partial sensing operation in sidelink communication.

As shown in FIG. 7, a partial sensing operation may be configured by higher layer signaling of a base station. A transmitting terminal may determine one or more candidate resources by performing the partial sensing operation within a sensing window, determine transmission resource(s) among the one or more candidate resources by performing a selection operation within a selection window, and perform sidelink communication with a receiving terminal using the transmission resource(s). In exemplary embodiments of the present disclosure, the transmitting terminal may be a terminal transmitting data (e.g., sidelink data), and the receiving terminal may be a terminal receiving the data.

The selection window may be configured in a period $[n+T_1, n+T_2]$. The candidate resource(s) may be configured in a specific subframe (e.g., subframe $t_y$) within the selection window. The subframe $t_y$ may refer to a subframe having a start time $t_y$. The candidate resource(s) may be configured periodically. For example, a configuration periodicity of the candidate resource(s) may be 100 milliseconds (ms). The candidate resource(s) may correspond to a result of the partial sensing operation performed in the sensing window. The partial sensing operation may be performed in a partial sensing window within the sensing window, and a configuration periodicity of the partial sensing window(s) may be $P_{step}$.

The length of the sensing window may be 1000 ms, and up to 10 partial sensing windows may be configured within the sensing window. A start time of each of the partial sensing window(s) may be determined based on the subframe $t_y$. For example, the start time of each of the partial sensing window(s) may be a subframe $t_y$-k×$P_{step}$. k may be set by higher layer signaling. The base station may transmit a bitmap indicating k (e.g., gapCandidateSensing) to the terminal (e.g., transmitting terminal and/or receiving terminal) using higher layer signaling. The size of the bitmap may be 10 bits. When the bitmap is set to 1001000110, four partial sensing windows may be configured within the sensing window. The start time of the first partial sensing window may be a subframe $t_y$-900 ms, the start time of the second partial sensing window may be a subframe $t_y$-800 ms, the start time of the third partial sensing window may be a subframe $t_y$-400 ms, and the start time of the fourth partial sensing window may be a subframe $t_y$-100 ms. That is, when the bitmap is set to 1001000110, k may be 1, 4, 8, or 9. Here, $P_{step}$ may be 100 ms.

Meanwhile, in sidelink communication, a re-evaluation operation and/or a pre-emption operation may be performed. In addition, the candidate resource(s) and/or the transmission resource(s) may be configured aperiodically. The re-evaluation operation and/or pre-emption operation may be performed in a period (e.g., $[t_y-P_{step}, t_y]$) before the selected transmission resource or a period from an end time of the sensing window to a start time of the selection window within the selection window, and resource(s) may be selected by the re-evaluation operation and/or the pre-emption operation. The resource(s) according to the re-evaluation operation and/or the pre-emption operation may collide with the transmission resource(s) corresponding to the result of performing the selection operation within the selection window. When a sensing window (e.g., partial sensing window) is not configured in the period $[t_y-P_{step}, t_y]$, the above-described resource collision problem may occur.

FIG. 8 is a sequence chart illustrating a first exemplary embodiment of a method for configuring additional partial sensing window(s) in sidelink communication.

As shown in FIG. 8, a communication system may include a base station, a transmitting terminal, and a receiving terminal. The base station may be the base station 210 shown in FIG. 2, the transmitting terminal may be the UE 235 shown in FIG. 2, and the receiving terminal may be the UE 236 shown in FIG. 2. Each of the base station, the transmitting terminal, and the receiving terminal may be configured identically or similarly to the communication node 300 shown in FIG. 3. The transmitting terminal and the receiving terminal may support the protocol stacks shown in FIG. 4, FIG. 5 and FIG. 6.

The base station may generate configuration information of additional partial sensing window(s), and transmits a higher layer message (e.g., system information and/or RRC message) including the configuration information of the additional partial sensing window(s) to the terminal (e.g., transmitting terminal and/or receiving terminal) (S801). The additional partial sensing window(s) may be configured independently of the partial sensing window (hereinafter, referred to as 'existing partial sensing window') configured within the sensing window. The additional partial sensing window(s) may be configured in the period $[t_y-P_{step}, t_y]$ or the period from the end time of the sensing window to the start time of the selection window. $t_y$ may be a start time of a candidate resource (e.g., first-positioned candidate resource) or a start time of a transmission resource (i.e., selected resource) within the selection window. $P_{step}$ may be a configuration periodicity of the existing partial sensing window within the sensing window. Another value may be used instead of $P_{step}$, and the base station may transmit a higher layer message including the another value to the transmitting terminal and/or the receiving terminal. The configuration information of additional partial sensing window(s) may include one or more information elements defined in Table 3 below.

TABLE 3

| | Description |
|---|---|
| Type 2-bitmap | Each bit of the type 2-bitmap may indicate a start time of an additional partial sensing window |
| Number N of applications | N indicates the number of times of applying the type 2-bitmap. For example, when N = 2, the bitmap may be applied to a first period and a second period. |
| $P_{step-add}$ | Pstep-add may indicate a configuration periodicity of the additional partial sensing window. |
| Scale information | Scale information indicates a scale for $P_{step}$ and $P_{step-add}$. |
| Enable indicator | Enable indicator set to 0 may indicate that additional partial sensing window(s) are not configured. Enable indicator set to 1 may indicate that the additional partial sensing window(s) are configured. | gapCadidateSensing indicating the start time of the existing partial sensing window may be used as the type 2-bitmap indicating the start time of the additional partial sensing window. When the bitmap indicating the start time of the additional partial sensing window is referred to as 'type 2-bitmap', the bitmap indicating the start time of the existing partial sensing window may be referred to as 'type 1-bitmap'. The type 2-bitmap may include b bits. b may be a natural number. For example, b may be 2, 5, 10, or 20.

Alternatively, a separate parameter (e.g., add-gapCadidateSensing) for the type 2-bitmap indicating the start time of the partial sensing window may be configured. add-gapCadidateSensing may be distinguished from gapCadidateSensing indicating the start time of the existing partial sensing window.

The transmitting terminal may receive the configuration information of additional partial sensing window(s) from the base station, and may configure additional partial sensing window(s) based on the configuration information (S802). In exemplary embodiments of the present disclosure, a time resource (e.g., sensing window, existing partial sensing window, additional partial sensing window, and/or selection window) may be configured in units of symbol(s) (e.g., orthogonal frequency division multiplexing (OFDM) symbol, orthogonal frequency division multiple access (OFDMA) symbol, single carrier (SC)-frequency division multiplexing (FDM) symbol, or SC-frequency division multiple access (SC-FDMA) symbol), mini-slot(s), slot(s), subframe(s), transmission time interval(s) (TTI(s)), or an absolute time (e.g., milliseconds or seconds).

The transmitting terminal may identify the start time(s) of the additional partial sensing window(s) based on the type 2-bitmap (e.g., gapCadidateSensing or add-gapCadidateSensing) and $P_{step-add}$, and may configure the additional partial sensing window(s) based on the start time(s). The additional partial sensing window(s) may be configured in the period $[t_y\text{-}P_{step}, t_y]$. When the type 2-bitmap is 1001000110, $P_{step}$ is 100 ms, and $P_{step-add}$ is 10 ms, the transmitting terminal may configure four additional partial sensing windows in the period $[t_y\text{-}100 \text{ ms}, t_y]$. The start time of the first additional partial sensing window may be a subframe $t_y$-90 ms, the start time of the second additional partial sensing window may be a subframe $t_y$-80 ms, the start time of the third additional partial sensing window may be a subframe $t_y$-40 ms, and the start time of the fourth additional partial sensing window may be a subframe $t_y$-10 ms.

$P_{step-add}$ may be set shorter than $P_{step}$ for the existing partial sensing window. For example, $P_{step-add}$ may be $P_{step}/$ 10. The scale information for $P_{step-add}$ and $P_{step}$ may be received in the step S801. $P_{step-add}$ may be set shorter than 10 ms. $P_{step-add}$ may be determined based on the number N of applications of the type 2-bitmap. $P_{step-add}$ may be inversely proportional to the number N of applications. This operation may be applied when $P_{step-add}$ is not explicitly indicated by the base station. N may be a natural number. For example, when the number N of applications is 2 and $P_{step}$ is 100 ms, the type 2-bitmap may be applied to a first period (e.g., $[t_y\text{-}100 \text{ ms}, t_y\text{-}50 \text{ ms}]$) and a second period (e.g., $[t_y\text{-}50 \text{ ms}, t_y]$). $P_{step-add}$ may be set to 10 ms/N or $(P_{step}/10)/N$. That is, $P_{step-add}$ may be 5 ms. In each of the first period and the second period, the additional partial sensing window may be configured at a periodicity of 5 ms.

For another example, when the number N of applications is 5 and $P_{step}$ is 100 ms, the type 2-bitmap may be applied to a first period (e.g., $[t_y\text{-}100 \text{ ms}, t_y\text{-}80 \text{ ms}]$), a second period (e.g., $[t_y\text{-}80 \text{ ms}, t_y\text{-}60 \text{ ms}]$), a third period (e.g., $[t_y\text{-}60 \text{ ms}, t_y\text{-}40 \text{ ms}]$), a fourth period (e.g., $[t_y\text{-}40 \text{ ms}, t_y\text{-}20 \text{ ms}]$), and a fifth period (e.g., $[t_y\text{-}20 \text{ ms}, t_y]$). $P_{step-add}$ may be set to 10 ms/N or $(P_{step}/10)/N$. That is, $P_{step-add}$ may be 2 ms. In each of the first to fifth periods, the additional partial sensing window may be configured at a periodicity of 2 ms.

The number N of applications may be set for each resource pool or sidelink service. The number N of applications may be set by PC5 RRC signaling between terminals (e.g., transmitting terminal and/or receiving terminal).

As another method, the transmitting terminal may configure the additional partial sensing window(s) using some bits in the type 2-bitmap. For example, the transmitting terminal may use m bits out of all b bits included in the type 2-bitmap. m may be a natural number smaller than b. The additional partial sensing window(s) may be configured in the period $[t_y\text{-}P_{step}, t_y]$.

When some bits in the type 2-bitmap are used, $P_{step-add}$ may be set longer than 10 ms. For example, when 5 most significant bits (MSBs) or 5 least significant bits (LSBs) in the type 2-bitmap are used, $P_{step-add}$ may be 20 ms. In the instant case, the transmitting terminal may configure the additional partial sensing window(s) at a periodicity of 20 ms. For another example, when 2 MSBs or 2 LSBs in the type 2-bitmaps are used, $P_{step-add}$ may be 50 ms. In the instant case, the transmitting terminal may configure the additional partial sensing window(s) at a periodicity of 50 ms. In the above-described exemplary embodiment of the present disclosure, $P_{step-add}$ may be set to ($P_{step}$/the number of bits used in the type 2-bitmap).

As another method, the transmitting terminal may configure the additional partial sensing window(s) based on a ratio of bits set to 0 and/or a ratio of bits set to 1 in the type 2-bitmap. For example, when $P_{step}$ is 100 ms and the type 2-bitmap is set to 1001000110 (i.e., 4 bits out of 10 bits are set to 1), the transmitting terminal may configure the additional partial sensing window(s) in a partial period (e.g., $[t_y\text{-}100 \text{ ms}, t_y\text{-}60 \text{ ms}]$) after $t_y$-100 ms or a partial period (e.g., $[t_y\text{-}40 \text{ ms}, t_y]$) before $t_y$ within the period $[t_y\text{-}100 \text{ ms}, t_y]$. That is, the size of the additional partial sensing window within the period $[t_y\text{-}100 \text{ ms}, t_y]$ may be determined based on a ratio of the first value (e.g., 0) or the second value (e.g., 1) in the type 2-bitmap. The transmitting terminal may continuously perform the partial sensing operation in the above-described partial periods.

$P_{step}$ or $P_{step}$-add may be set in association with other parameters (e.g., subcarrier spacing). For example, as shown in Table 4 below, $P_{step}$ or $P_{step}$-add may be associated (e.g., mapped) to a subcarrier spacing.

TABLE 4

| $\mu$ | $\Delta f = 2^\mu \cdot 15$[kHz] | Periodicity |
|---|---|---|
| 0 | 15 | $P_{step}$ or $P_{step\text{-}add}$ |
| 1 | 30 | $P_{step}/2$ or $P_{step\text{-}add}/2$ |
| 2 | 60 | $P_{step}/4$ or $P_{step\text{-}add}/4$ |
| 3 | 120 | $P_{step}/8$ or $P_{step\text{-}add}/8$ |
| 4 | 240 | $P_{step}/16$ or $P_{step\text{-}add}/16$ |

The information in Table 4 (e.g., mapping information between $P_{step}$ or $P_{step}$-add and subcarrier spacings) may be transmitted in the step S801. Alternatively, the information in Table 4 may be transmitted through a step separate from the step S801. Each of $P_{step}$ and $P_{step}$-add may be independently set for each subcarrier spacing. For example, each of $P_{step}$ and $P_{step}$-add may be set differently for each subcarrier spacing. According to the above-described exemplary embodiment of the present disclosure, the additional partial sensing window(s) may be configured as follows.

FIG. 9 is a conceptual diagram illustrating a first exemplary embodiment of additional partial sensing window(s) in sidelink communication.

As shown in FIG. 9, additional sensing window(s) may be configured in the period $[t_y\text{-}P_{step}, t_y]$. $t_y$ may be a start time of a candidate resource (e.g., first-positioned candidate resource) or a start time of a transmission resource (i.e., selected resource) within the selection window. $P_{step}$ may be 100 ms. Alternatively, the additional partial sensing window(s) may be configured in a period (e.g., the entire period or a partial period of the sensing window, or a period from the start time of the sensing window to the start time of the selection window) as well as in the period $[t_y\text{-}P_{step}, t_y]$.

Referring again to FIG. 8, the transmitting terminal may perform a sensing operation (e.g., full sensing operation or partial sensing operation) within the sensing window to transmit data (e.g., sidelink data) to the receiving terminal (S803). The step S803 may be performed before or after the step S802. The transmitting terminal may determine one or more candidate resources by performing the sensing operation. Before performing a selection operation on the one or more candidate resources in a selection window, the transmitting terminal may perform a partial sensing operation in the additional partial sensing window(s) configured in the step S802 (S804). In the step S804, the transmitting terminal may identify existence of resource(s) selected by a re-evaluation operation and/or pre-emption operation by performing the partial sensing operation. That is, the transmitting terminal may identify an occupancy state of at least one candidate resource among the one or more candidate resources determined by the sensing operation (e.g., whether candidate resource(s) selected by the re-evaluation operation and/or pre-emption operation exist).

The transmitting terminal may select transmission resource(s) by performing a selection operation within the selection window in consideration of the result of the step S804 (S805). The transmitting terminal may select transmission resource(s) among candidate resource(s) excluding the resource(s) used by another terminal (e.g., the resource(s) selected by the re-evaluation operation and/or pre-emption operation) from the one or more candidate resources. That is, the occupied resource(s) identified in the step S804 may not be selected as the transmission resource(s). The transmitting terminal may transmit data to the receiving terminal using the selected transmission resource(s) (S806). The receiving terminal may receive the data from the transmitting terminal.

On the other hand, considering a power saving operation based on a random resource selection operation and/or the partial sensing operation, a region where the random resource selection operation is performed and a region where the partial sensing operation is performed may be configured differently within a resource pool. A higher layer parameter (e.g., gapCandidateSensing) may be used to support the above operation. The region where the random resource selection operation is performed and the region where the partial sensing operation is performed may be configured according to a value of gapCandidateSensing. In the instant case, a window indicated by gapCandidateSensing within the same resource pool may be used for both the random resource selection operation and the partial sensing operation. That is, it may be assumed that both the random resource selection operation and the partial sensing operation are performed in the above-described resource pool. In addition, it may be assumed that a terminal using the above-described resource pool performs both the random resource selection operation and the partial sensing operation.

FIG. 10 is a conceptual diagram illustrating a region in which a random resource selection operation is performed and a region in which a partial sensing operation is performed.

As shown in FIG. 10, when gapCandidateSensing is set to 0000100101, the partial sensing operation may not be performed in a region corresponding to a bit set to 0. That is, the random resource selection operation may be performed in the region corresponding to the bit set to 0. Accordingly, the region corresponding to the bit set to 0 may be the region in which the random resource selection operation is performed. Regions other than the regions in which the random resource selection operation is performed among the entire regions may be region(s) in which the partial sensing operation is performed. The region where the partial sensing operation is performed may be a region corresponding to a bit set to 1.

Each of the above-described exemplary embodiment(s), the above-described configuration(s), whether or not the above-described configuration(s) are applied, the above-described condition(s), whether or not the above-described condition(s) are applied, the above-described parameter(s), or whether or not the above-described parameter(s) are applied may be independently configured by at least one of system information, RRC message, MAC CE, control information, or PC5 signaling message, according to a resource pool, service type, priority, performance state of power saving operation, quality of service (QoS) parameter (e.g., reliability, latency), and/or a UE type (e.g., vehicle (V)-UE or pedestrian (P)-UE). Each of the above-described configuration(s) and the above-described parameter(s) may be implicitly indicated based on preconfigured parameter(s).

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured for the present disclosure or may be publicly known and available to those who are skilled in the field of computer software.

Examples of the computer readable medium may include a hardware device such as ROM, RAM, and flash memory, which are configured to store and execute the program instructions. Examples of the program instructions include machine codes made by, for example, a compiler, as well as high-level language codes executable by a computer, using an interpreter. The above exemplary hardware device may be configured to operate as at least one software module to perform the exemplary embodiments of the present disclosure, and vice versa.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of a transmitting user equipment (UE), the method comprising:

receiving, by a processor, from a base station, configuration information for additional partial sensing;

determining, by the processor, one or more candidate resources by performing a sensing operation in a sensing window;

identifying, by the processor, an occupancy state of at least one candidate resource among the one or more candidate resources by performing a partial sensing operation;

determining, by the processor, a first candidate resource among the one or more candidate resources as a transmission resource within a selection window in consideration of the occupancy state; and performing, by the processor, sidelink communication with a receiving UE using the transmission resource, wherein an additional partial sensing window is configured independently of an existing partial sensing window, and the partial sensing operation is performed on the at least one candidate resource, belonging to the additional partial sensing window, among the one or more candidate resources determined by the sensing operation, and wherein the configuration information includes an enable indicator indicative of whether to configure the additional partial sensing window, the additional partial sensing window is not configured based on the enable indicator indicating a first value, and the additional partial sensing window is configured based on the enable indicator indicating a second value.

2. The operation of claim 1, wherein the additional partial sensing window is configured within a period $[t_y\text{-}P_{step}, t_y]$, where $t_y$ is a start time of a specific candidate resource within the selection window, and $P_{step}$ is periodicity of the existing partial sensing window within the sensing window.

3. The operation of claim 2, wherein periodicity of the additional partial sensing window is set to be shorter than the $P_{step}$.

4. The operation of claim 1, wherein the configuration information further includes at least one of a type 2-bitmap indicating a start time of the additional partial sensing window, information indicating a number of times of applying the type 2-bitmap, periodicity of the additional partial sensing window, or information of a scale for the periodicity.

5. The operation of claim 4, wherein when the number of times of applying the type 2-bitmap is N, a period $[t_y\text{-}P_{step}, t_y]$, in which the additional partial sensing window is configured is divided into N sub-periods, and the type 2-bitmap is applied to each of the N sub-periods, N being a natural number.

6. The operation of claim 4, wherein the periodicity of the additional partial sensing window is inversely proportional to the number of times of applying the type 2-bitmap.

7. The operation of claim 4, wherein a size of the additional partial sensing window is determined according to a ratio of a first value or a second value in the type 2-bitmap.

8. The operation of claim 1, wherein periodicity of the additional partial sensing window is set differently for each subcarrier spacing.

9. The operation of claim 1, wherein a candidate resource occupied by another UE among the one or more candidate resources is not determined as the transmission resource.

10. The operation of claim 9, wherein the occupied candidate resource is a resource selected by a re-evaluation operation or a pre-emption operation.

11. A transmitting user equipment (UE), the transmitting UE comprising:

a processor; and a memory storing one or more instructions executable by the processor, wherein the one or more instructions are executed to perform:

receiving, from a base station, configuration information of an for additional partial sensing;

determining one or more candidate resources by performing a sensing operation in a sensing window;

identifying an occupancy state of at least one candidate resource among the one or more candidate resources by performing a partial sensing operation based on the configuration information for the additional partial sensing;

determining a first candidate resource among the one or more candidate resources as a transmission resource within a selection window in consideration of the occupancy state; and performing sidelink communication with a receiving UE using the transmission resource, wherein an additional partial sensing window is configured independently of an existing partial sensing window, and the partial sensing operation is performed on the at least one candidate resource, belonging to the additional partial sensing window, among the one or more candidate resources determined by the sensing operation, and wherein the configuration information includes an enable indicator indicative of whether to configure the additional partial sensing window, the additional partial sensing window is not configured based on the enable indicator indicating a first value, and the additional partial sensing window is configured based on the enable indicator indicating a second value.

12. The UE of claim 11, wherein the additional partial sensing window is configured within a period $[t_y\text{-}P_{step}, t_y]$, where $t_y$ is a start time of a specific candidate resource within the selection window, $P_{step}$ is periodicity of existing partial sensing window within the sensing window, and periodicity of the additional partial sensing window is set to be shorter than the $P_{step}$.

13. The UE of claim 11, wherein the configuration information further includes at least one of a type 2-bitmap indicating a start time of the additional partial sensing window, information indicating a number of times of applying the type 2-bitmap, periodicity of the additional partial sensing window, or information of a scale for the periodicity.

14. The UE of claim 13, wherein when the number of times of applying the type 2-bitmap is N, a period $[t_y\text{-}P_{step}, t_y]$, in which the additional partial sensing window is configured is divided into N sub-periods, and the type 2-bitmap is applied to each of the N sub-periods, N being a natural number.

15. The UE of claim 13, wherein a size of the additional partial sensing window is determined according to a ratio of a first value or a second value in the type 2-bitmap.

16. The UE of claim 11, wherein periodicity of the additional partial sensing window is set differently for each subcarrier spacing.

17. The UE of claim 11, wherein a candidate resource occupied by another UE among the one or more candidate resources is not determined as the transmission resource, and the occupied candidate resource is a resource selected by a re-evaluation operation or a pre-emption operation.

* * * * *